United States Patent [19]

Kishi et al.

[11] Patent Number: 4,680,719
[45] Date of Patent: Jul. 14, 1987

[54] METHOD OF CONTROLLING COMB-CUTTER LATHE

[75] Inventors: Hajimu Kishi; Masaki Seki; Takashi Takegahara, all of Tokyo, Japan

[73] Assignee: Fanuc Ltd., Tokyo, Japan

[21] Appl. No.: 621,925

[22] PCT Filed: Oct. 25, 1983

[86] PCT No.: PCT/JP83/00373
§ 371 Date: Jun. 18, 1984
§ 102(e) Date: Jun. 18, 1984

[87] PCT Pub. No.: WO84/01730
PCT Pub. Date: May 10, 1984

[30] Foreign Application Priority Data

Oct. 25, 1982 [JP] Japan .................... 57-187299

[51] Int. Cl.$^4$ .................... G05B 19/00; G06F 15/00
[52] U.S. Cl. .................... 364/474; 82/2 B
[58] Field of Search .................... 82/2 B; 29/568; 364/167–171, 474, 475, 513

[56] References Cited

U.S. PATENT DOCUMENTS

| 3,854,353 | 12/1974 | Cutler | 364/475 |
| 4,033,206 | 7/1977 | Morita | 364/475 |
| 4,074,349 | 2/1978 | Ueda | 364/170 |
| 4,131,836 | 12/1978 | Noda | 364/474 |
| 4,199,814 | 4/1980 | Rapp | 364/900 |
| 4,424,569 | 1/1984 | Imazeki | 364/169 |
| 4,442,493 | 4/1984 | Wakai | 364/475 |
| 4,445,182 | 4/1984 | Morita | 364/474 |
| 4,490,781 | 12/1984 | Kishi et al. | 364/147 |
| 4,513,380 | 4/1985 | Spooner | 364/474 |
| 4,521,860 | 6/1985 | Kanematsu | 364/171 |

Primary Examiner—Jerry Smith
Assistant Examiner—Allen MacDonald
Attorney, Agent, or Firm—Staas & Halsey

[57] ABSTRACT

A method of controlling a comb-cutter lathe in which one face of a tool rest (TBS) is provided with two or more juxtaposed tools (TL1, TL2) for subjecting a workpiece (WK) to machining by using: (1) predetermined tools in succession, (2) part dimensions, (3) a tool selection sequence, (4) a machining start location for each tool, and (5) mounting dimension information measured from a reference point on the tool rest to a distal end of each tool. Machining is sequentially performed based on this information by predetermined tools at machining locations ($P_5$-$P_4$-$P_3$-$P_2$-$P_1$; $P_6$-$P_7$-$P_8$-$P_9$-$P_{10}$) assigned to the tools, and after machining is completed by a first tool (TL1), the tool rest (TBS) is moved to position the next tool (TL2) at a machining location and machining is performed by that tool. The method includes moving the tool rest along a Z axis to a point $P_r$ at which none of the tools (TL1, TL2) will contact the workpiece (WK) when the tool rest (TBS) is moved in a direction (X-axis direction) at right angles to the longitudinal direction (Z-axis direction) of the workpiece, and thereafter moving the tool rest along the X axis to a point $P_t$ at which an X-axis position of a selected tool coincides with an X-axis coordinate value of a position at which machining is to be started by the selected tool, and thenforth performing machining using the selected tool.

5 Claims, 15 Drawing Figures

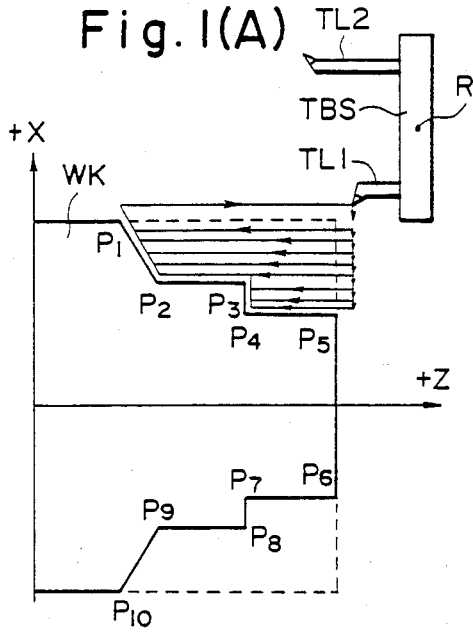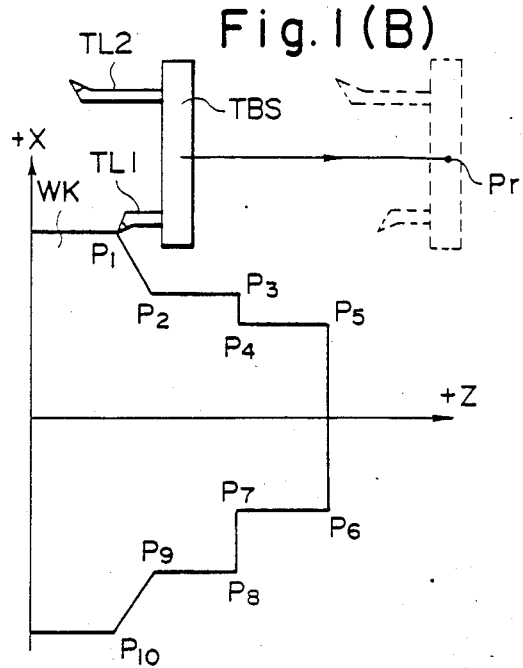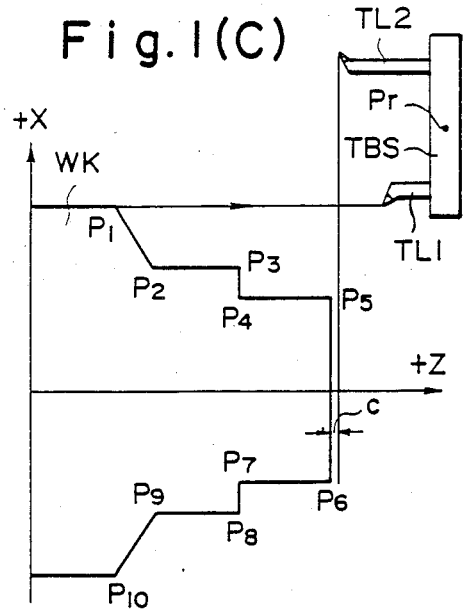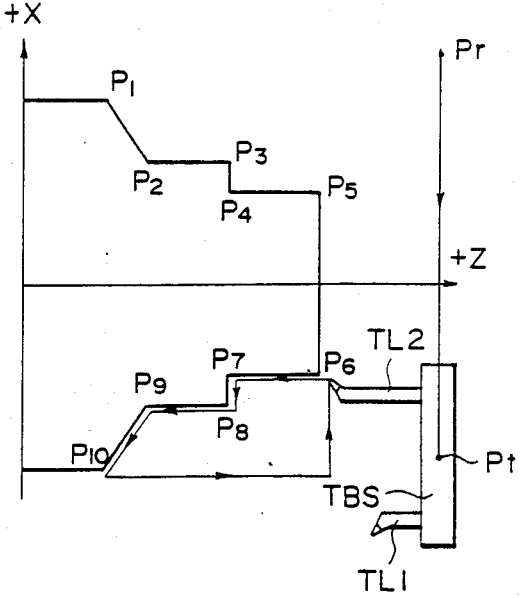

Fig. 5
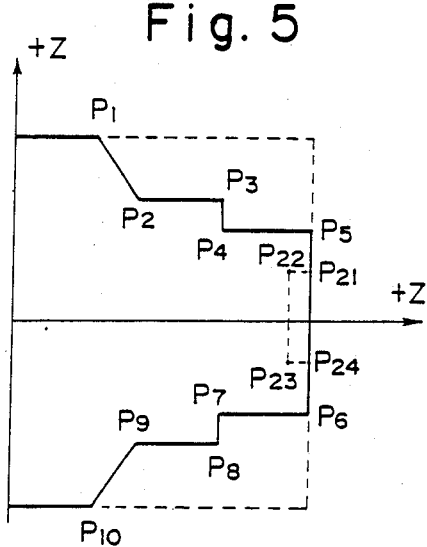
Fig. 6
| T1 |
| --- |
| ΔX1, ΔZ1 |
| P5, P4, P3, P2, P1 |
| T2 |
| ΔX2, ΔZ2 |
| P6, P7, P8, P9, P10 |
| T3 |
| ΔX3, ΔZ3 |
| P11, P12, P13, P14 |
Fig. 7
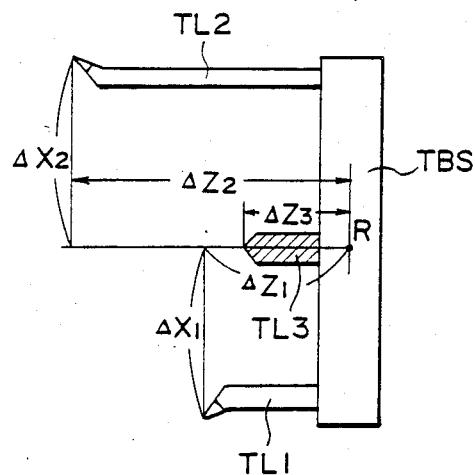
Fig. 8
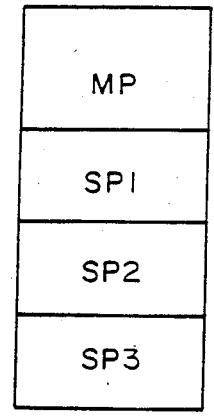

METHOD OF CONTROLLING COMB-CUTTER LATHE

CROSS REFERENCE TO RELATED APPLICATIONS

This application is related to copending U.S. patent application U.S. Ser. No. 621,927.

BACKGROUND OF THE INVENTION

This invention relates to a method of controlling a comb-cutter lathe in which one face of a tool rest is provided with two or more juxtaposed tools for subjecting a workpiece to machining by using predetermined tools in succession.

When it becomes necessary to change tools in an ordinary turret lathe, the turret is moved to a position where the tools will not interfere with a stationary part of the machine or with the workpiece even when the turret is rotated. The turret is then rotated to select the desired tool, and the selected tool is positioned at a machining starting point. Machining is then performed by the selected tool. Since a turret lathe thus requires moving the turret to a tool changing position, selecting a tool by rotation of the turret, and positioning the turret at a machining starting point, a comparatively long period of time is needed to select a tool. In machining a small article that requires a machining time of from 10 seconds to several minutes, the amount of time needed for tool selection cannot be ignored. In particular, where a large number of lots are concerned, a reduction in the tool selection time is desired. To achieve a machining time reduction a comb-cutter lathe has come into use because it has a plurality of tools provided in juxtaposition on one face of a tool rest, with predetermined ones of the tools being used one after another to machine a workpiece. An advantage of a comb-cutter lathe of this kind is that tool selection time is shortened since it is unnecessary to rotate the tool rest when selecting a tool. With a comb-cutter lathe, however, it is necessary to slide the tool rest when selecting a tool, and to arrange the tools so that they do not interfere with the workpiece when sliding takes place.

SUMMARY OF THE INVENTION

Accordingly, an object of the present invention is to provide a method of controlling a comb-cutter lathe wherein a tool will not interfere with a workpiece when a tool rest is slid during tool selection.

Another object of the present invention is to provide a method of controlling a comb-cutter lathe wherein the path of a tool rest at the time of a tool selection is generated automatically.

A further object of the present invention is to provide a method of controlling a comb-cutter lathe wherein the path of a tool rest at the time of a tool selection can be shortened to enable a reduction in the time needed for the tool selection.

The present invention provides a method of controlling a comb-cutter lathe wherein machining at machining locations assigned to respective tools mounted on a tool rest is performed in sequential fashion, and after completion of machining performed by one tool, the tool rest is moved in order to position a subsequent tool at a machining location where machining is to be performed by that tool. The method includes: (1) moving the tool rest along a Z axis (longitudinal direction) to a point $P_r$ at which none of the tools will contact the workpiece when the tool rest is moved in a direction (X-axis direction) at right angles to the longitudinal direction (Z-axis direction) of the workpiece, and (2) thereafter moving the tool rest along the X axis to a point $P_t$ at which an X-axis position of a selected tool will coincide with an X-axis coordinate value of a position at which machining is to be started by the tool, and thenceforth performing machining using a selected tool. According to the invention, a tool will not interfere with the workpiece when a tool is selected, and tools can be changed along the shortest path.

BRIEF DESCRIPTION OF THE DRAWINGS

FIGS. 1(A)–1(D) illustrate the machining performed by a comb-cutter lathe;

FIG. 5 illustrates the final contour of a part as displayed on a CRT;

FIG. 6 shows an example of data input for each machining process for machining the contour shown in FIG. 5;

FIG. 7 shows tool mounting positions on a comb-cutter tool rest;

FIG. 8 shows according to the present invention a created part program;

DESCRIPTION OF THE PREFERRED EMBODIMENTS

FIGS. 1(A)–1(D) illustrate machining performed by a comb-cutter lathe in which one face of a tool rest TBS is provided with two tools TL1 and TL2 in juxtaposition. We will assume that a workpiece WK having a stock contour indicated by the dashed line is to be machined into the part contour indicated by the solid line, and that the portion $P_1$-$P_2$-$P_3$-$P_4$-$P_5$ of the part contour is to be subjected to coarse machining in the first quadrant by the tool TL1, which is for coarse machining, and that the portion $P_6$-$P_7$-$P_8$-$P_9$-$P_{10}$ of the part contour is to be subjected to fine machining in the fourth quadrant by the tool TL2, which is for fine machining. The workpiece WK has a turning axis which coincides with the Z axis shown in FIGS. 1(A)–1(D).

First, the tool TL1 is moved as in turning work performed by an ordinary turret lathe (see the fine lines in the first quadrant of FIG. 1(A)) to provide a coarse machined part contour indicated by $P_1$-$P_2$ . . . -$P_5$ (see FIG. 1(B)).

Next, assuming that fine machining must be performed in the fourth quadrant by the tool TL2, a Z-axis position $P_r$ (FIG. 1(B)) determined so that the tools TL1 and TL2 will not contact the workpiece WK when the tool rest TBS is moved along the X axis. The tool rest TBS is then moved to the position $P_r$ (FIG. 1(C)).

Thereafter, the tool rest TBS is transported along the X axis to a point $P_t$ [FIG. 1(D)] where the X-axis position of the tool TL2 for fine machining coincides with the X-axis coordinate value of a position $P_6$ where machining performed by the tool is to start. Thenceforth, the tool rest is transported along the path $P_6 \rightarrow P_7 \rightarrow P_8 \rightarrow P_9 \rightarrow P_{10}$ to perform fine machining with the selected tool TL2.

To perform the foregoing control in accordance with the present invention, NC data is created from: (1) the part dimensions, (2) the tool selection sequence, (3) the machining location of each tool and reference positions of the respective tools. The data is stored in memory and control is effected by reading the NC data out of the memory one block at a time.

The method of controlling a comb-cutter lathe according to the present invention now be described in two parts, namely (I) processing for creating an NC part program, and (II) processing for machining performed by a comb-cutter lathe.

Figure 2:
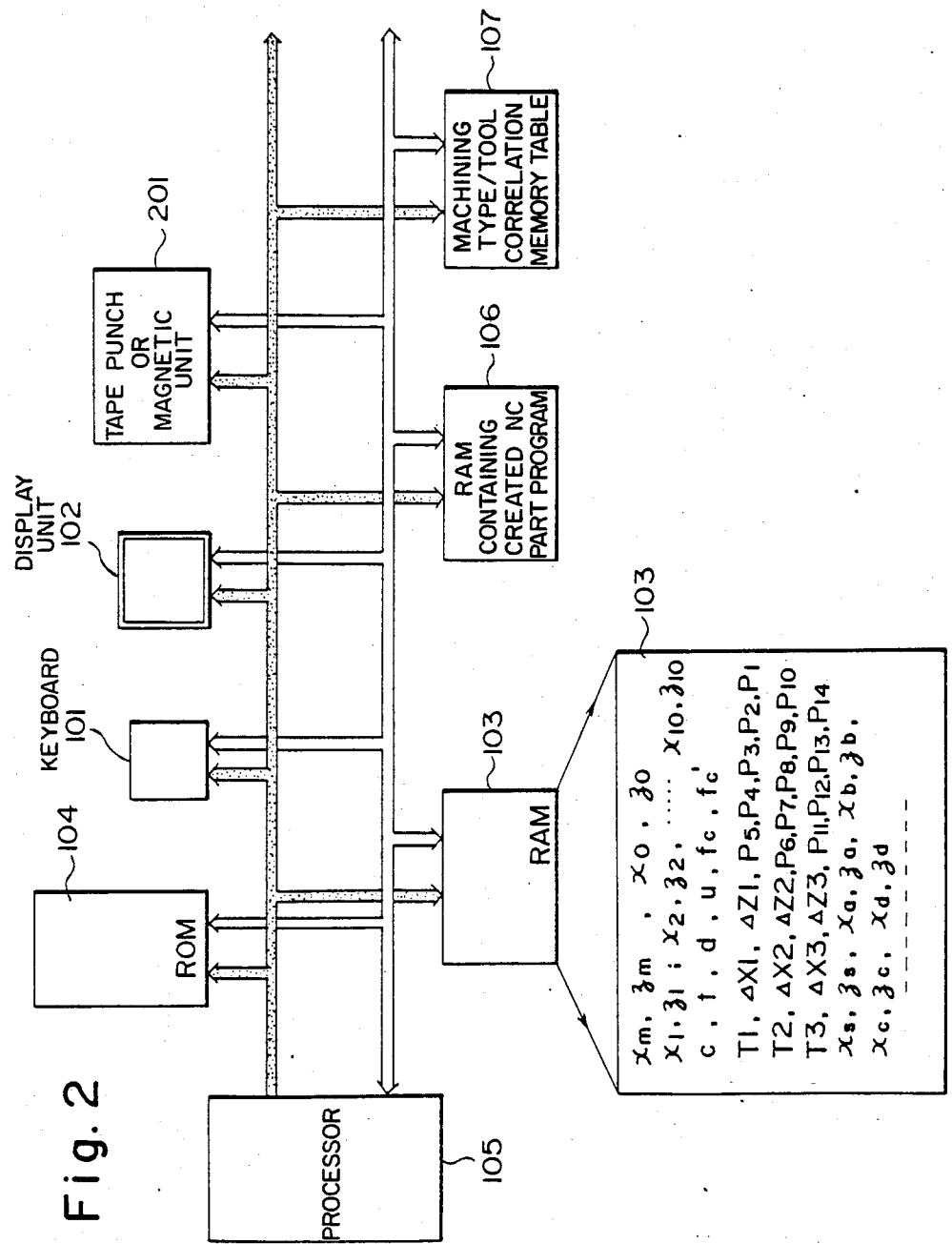
FIG. 2 is a block diagram of an automatic programming apparatus to which the present invention appertains.
Figure 3A:
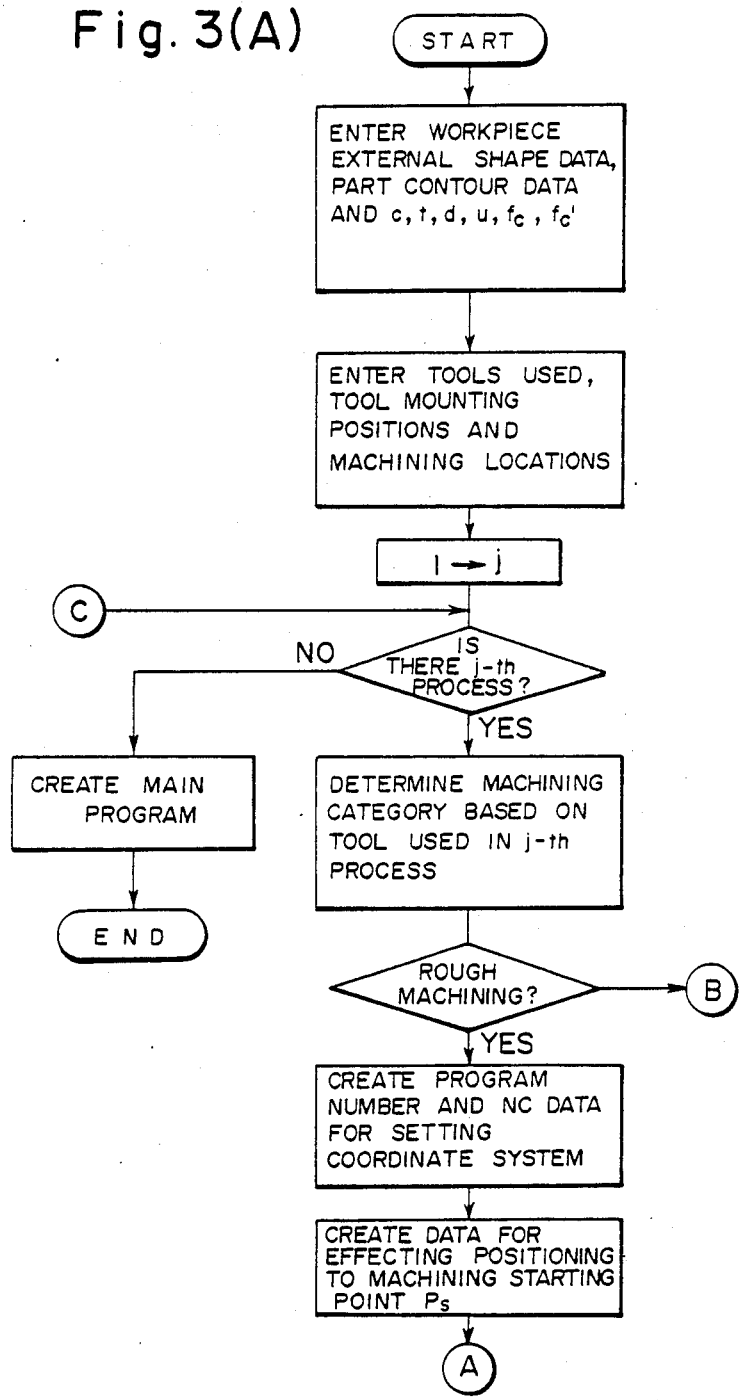
FIGS. 3(A)–3(C) illustrate a flowchart of the processing for creating a part program according to the present invention.
Figure 3B:
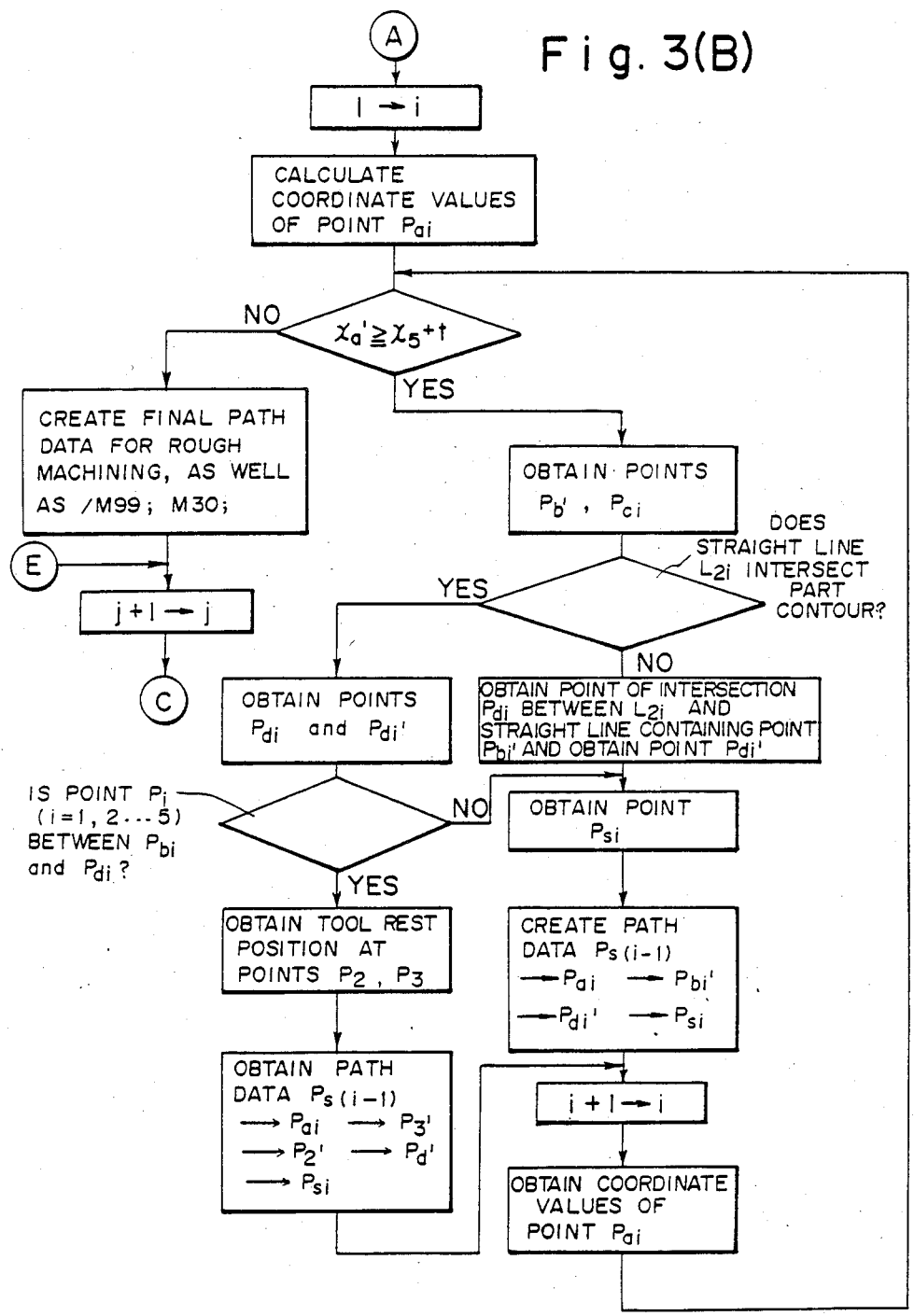
Figure 3C:
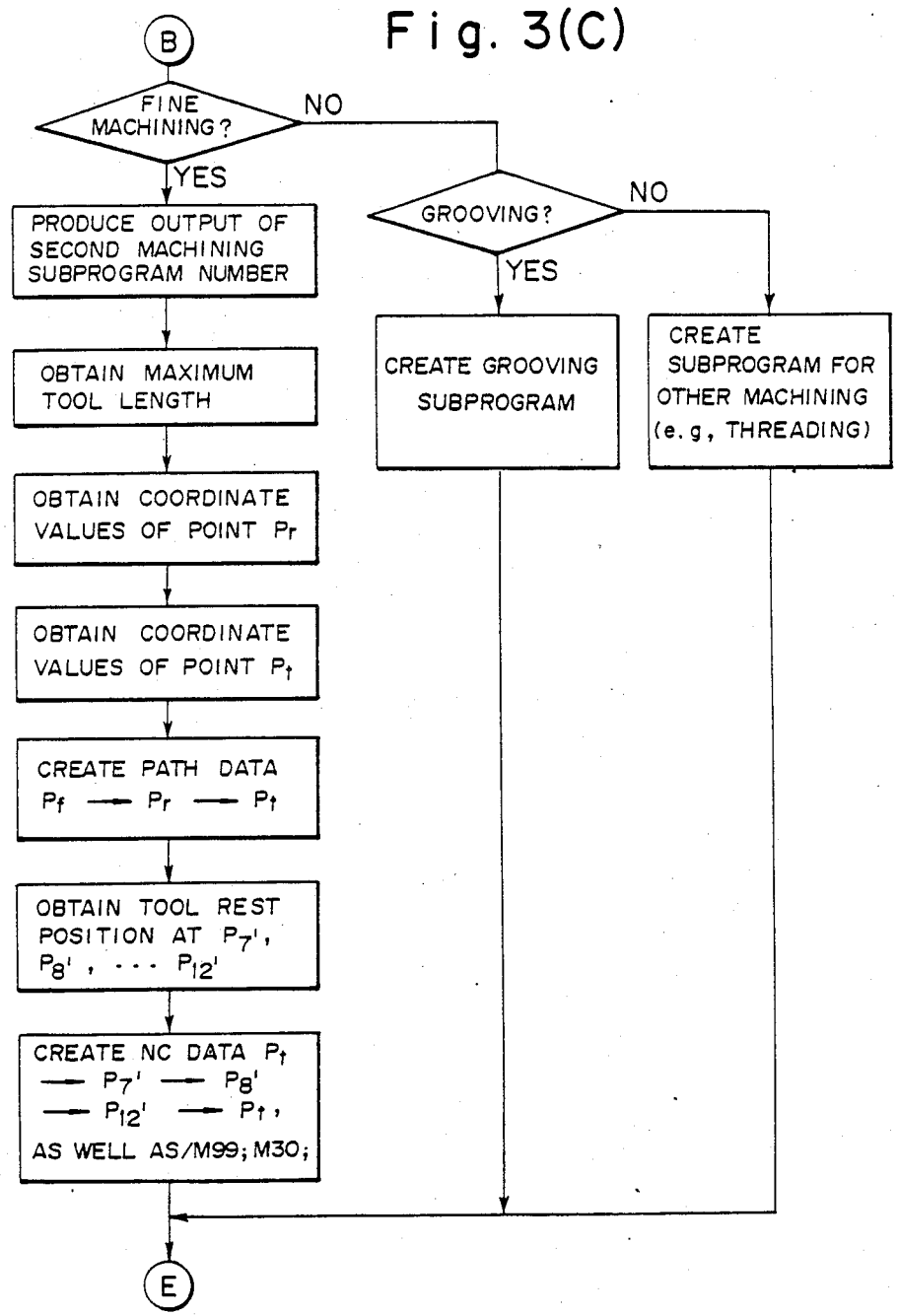

(I) Processing for creating an NC part program (1) First, a keyboard 101 and display unit 102 shown in FIG. 2 are used to enter data specifying (1) the external shape of the workpiece WK, e.g., coordinate values $x_m$, $z_m$ (see FIG. 4) of a point $P_m$, (2) part contour, e.g., coordinate values $x_i$, $z_i$ of a point $P_i$ (i=1, 2 ... 10), coordinate values $x_o$, $z_o$ of an initial position $P_o$ of a tool, a clearance distance c used during coarse machining, a finishing allowance t, depth of cut d for one pass, finishing increment u, coarse cutting speed $f_c$, and fine cutting speed $f_c'$. These data are stored in a RAM 103. Stock contour and part contour are displayed on the display unit 102, as shown in FIG. 5.

(2) Next, as shown in FIG. 6, the tool to be used (e.g., T1), the tool mounting position (e.g., $\Delta X1$, $\Delta Z1$) and the location to be machined by the tool (e.g., $P_5$, $P_4$, $P_3$, $P_2$, $P_1$) are entered and stored in the RAM 103 in the desired order of machining. The tool used is expressed by the letter of the alphabet "T" and a one-digit numerical value following "T". The tool mounting position, as shown in FIG. 7, is expressed by the distance (actually incremental values along the corresponding axes) from a reference point R on the tool rest TBS to the tool respective noses of tools TL1, TL2, TL3. The tool used and the mounting position of the tool are specified by entering a tool number "T□" and incremental values "$\Delta Xi$, $\Delta Zi$" for each of the prescribed tools. The location to be machined by each tool is specified by point numbers $P_1$, $P_2$ ... $P_{24}$ (FIG. 5). Specifically, a machining location is specified by entering these numbers into RAM 103 from the keyboard 101. Thus, information for first, second and third machining processes is stored in the RAM 103 and is given by the following:

$T_1:\Delta X_1, \Delta Z_1:P_5, P_4, P_3, P_2, P_1$;
$T_2:\Delta X_2, \Delta Z_2:P_6, P_7, P_8, P_9, P_{10}$;
$T_3:\Delta X_3, \Delta Z_3:P_{21}, P_{22}, P_{23}, P_{24}$ assuming that coarse machining is to be performed along $P_5$ through $P_1$ by the tool TL1 for coarse machining, fine machining is to be performed along $P_6$ through $P_{10}$ by the tool TL2 for fine machining, and grooving is to be performed along $P_{21}$ through $P_{24}$ by the grooving tool TL3. It should be noted that $T_1$, $T_2$, $T_3$ are the tool numbers of the tools TL1, TL2, TL3.

(3) When all data necessary for NC part program creation are entered through steps (1) and (2) above, a control program for creating a part program which is stored in a ROM 104 of FIG. 2 starts to run, and a processor 105, through processing described below, creates a subprogram for each machining process, creates a main program for calling the subprograms in the desired machining process order, and creates, in a RAM 106, an NC part program obtained by combining the created subprograms and main programs. The processing for creating both the subprograms and the main program will now be described.

(3a-1) The processor 105 determines whether a j-th machining process (where the initial value of j is 1) exists. If it does, the category of machining process (coarse machining, fine machining, grooving, threading, etc.) is recognized from the tool used in the process. A table 107 in FIG. 2 stores the correlation between machining category and the tool used to perform the machining. The processor 105 identifies the category of the j-th machining process based on the information in the table 107.

(3a-2) In order to create a subprogram for rough machining, which is the first machining process (j=1), the processor 105 generates a subprogram number for the j-th machining process, namely:

O000j

The processor stores the number in the RAM 106 and then uses the initial position ($x_o$, $z_o$) of the tool rest TBS stored in the RAM 103 to create NC data for setting the coordinate system, namely:

G50X$x_o$Z$z_o$;

The processor stores this data in the RAM 106.

(3a-3) The processor 105 then calculates the position $x_s$, $z_s$ of the tool rest TBS that will exist when the nose of the tool TL1 is situated at the machining starting point $P_2$, which is spaced from the point $P_m$ (FIG. 4) by the clearance c along both the X and Z axes. This position of the tool rest is calculated using the following equations where c is the clearance distance for coarse machining:

$$X_m + c + \Delta X_1 \rightarrow x_s$$

$$z_m + c + \Delta Z_1 \rightarrow z_s$$

When the coordinates of the machining starting point $P_s$ have been calculated, the processor creates the following data for effecting positioning from the initial position to the machining starting point $P_s$:

G00X$x_s$Z$z_s$;

and stores the data in the RAM 106.

(3a-4) Next, the processor 105 performs the operation $1 \rightarrow i$ and calculates the position $x_a$, $z_a$ of the tool rest TBS that will exist when the nose of the tool TL1 is situated at a point $P_{ai}(=P_{a1})$, which is spaced from the machining starting point $P_s$ by (c+d) (where c is the clearance distance for coarse machining and d is th depth of cut) along the $-X$ axis. This position of the tool rest is calculated from the following equations:

$$x_m - d + \Delta X_1 \rightarrow x_a$$

$$z_m + c + \Delta Z_1 \rightarrow z_a$$

(3a-4) After $x_a$, $z_a$ are calculated, the processor 105 determines whether the following holds:

$$x_a' \geq (x_5 + t)$$

(where $x_a'$, $x_5$ are the X-axis coordinate values of points $P_{ai}$ (=$P_{a1}$) and $P_5$, respectively).

(3a-5) If $x_a' \geq (x_5+t)$ holds, the processor 105 obtains a point $P_{bi}$ (=$P_{b1}$), which is where a straight line $L_{1i}$ parallel to the Z axis and passing through the point $P_{ai}$ (Pa1) intersects the part contour, and then obtains the position $x_b$, $z_b$ of the tool rest TBS that will exist when the nose of the tool TL1 is situated at a point $P_{b1}'$, which is spaced from the point of intersection $P_{b1}$ by the finishing margin t along the +Z axis. The processor also calculates the coordinate values $x_c$, $z_c$ of a point $P_{c1}$ which is spaced from the point $P_{b1}'$ by (d+u) along the +X axis, where u is the finish cut increment. These coordinate values are calculated from the following equations:

$$x_b' + d + u \rightarrow x_c$$

$$z_b' \rightarrow z_c$$

(where $x_b'$, $z_b'$ are the coordinate values of the point $P_{b1}'$).

(3a-6) The processor 105 then determines whether a straight line $L_{21}$ (=$L_{21}$) parallel to the Z axis and passing through the point $P_{c1}$ intersects the part contour.

(3a-7) If the straight line $L_{21}$ does not intersect the part contour, the processor 105 obtains the point of intersection $P_{d1}$ between the straight line $L_{21}$ and the extension of a straight line segment $P_2P_1$ containing the point $P_{b1}$, which straight line segment is from among the straight line segments $\overline{P_5P_4}$, $\overline{P_4P_3}$, $\overline{P_3P_2}$, $\overline{P_2P_1}$ that specify the part contour. Thereafter, the processor calculates the position $x_d$, $z_d$ of the tool rest that will exist when the nose of the tool TL1 is at a point $P_{d1}'$, which is spaced from the point of intersection $P_{d1}$ by the finishing margin t.

(3a-8) Next, the processor 105 calculates the position $x_s$, $z_s$ of the tool rest TBS that will exist when the nose of the tool TL1 is at the next machining starting point $P_{s1}$. This position is calculated from the following equations:

$$x_c + \Delta X_1 \rightarrow x_s$$

$$z_m + c + \Delta Z_1 \rightarrow z_s$$

(3a-9) When the coordinate values of each of the points occupied by the tool rest TBS have been found through the foregoing steps, the processor 105 uses these coordinate values to create and store the following in the RAM 106:

G00X$x_a$Z$z_a$;
G01X$x_b$Z$z_b$F$f_c$;
X$x_d$Z$z_d$;
G00X$x_s$Z$z_s$;

(3a-10) The processor 105 then performs the operation i+1→i and calculates the position $x_a$, $z_a$ of the tool rest TBS that will exist when the nose of the tool TL1 is situated at a point $P_{ai}$ (=$P_{a2}$), which is spaced from the machining starting point $P_{s1}$ by (2d+u) along the −X axis. This position of the tool rest is calculated from the following equations:

$$x_s - (2d+u) \rightarrow x_a$$

$$z_s \rightarrow z_a$$

Thereafter, the processor repeats the process steps from step (3a-4) onward.

(3a-11) If the straight line $L_{2i}$ (e.g., straight line $L_{22}$) is found to intersect the part contour at a point $P_{di}$ in step (3a-6), then the processor calculates the position $x_d$, $z_d$ of the tool rest TBS that will exist when the nose of the tool TL1 is situated at a point $P_{di}'$, which is spaced from the point of intersection $P_{di}$ (along the Z axis) by the finishing margin t.

(3a-12) Next, the processor 105 determines whether points $P_1$ through $P_5$, which specify the part contour, are located between points $P_{bi}$ and $P_{di}$. If the points $P_1$ through $P_5$ are not located between $P_{bi}$ and $P_{di}$, then processing from step (3a-8) onward is repeated.

(3a-13) If at least one of the points $P_1$ through $P_5$ ($P_2$, $P_3$) is found to lie between point $P_{bi}$ and point $P_{di}$ in executing step (3a-12), then the processor obtains the positions $x_3'$, $z_3'$ and $x_2'$, $z_2'$ of the tool rest TBS that will exist when the nose of the tool TL1 is respectively at points $P_3'$, $P_2'$, which are respectively spaced from the points $P_3$ and $P_2$ by the finishing margin t along both the +X and +Z axes. These positions are obtained from the following equations:

$$x_3 + t + \Delta X_1 \rightarrow x_3'$$

$$z_3 + t + \Delta Z_1 \rightarrow z_3'$$

$$x_2 + t + \Delta X_1 \rightarrow x_2'$$

$$z_2 + t + \Delta Z_1 \rightarrow z_2'$$

The processor 105, through processing similar to that of step (3a-8), then obtains the position $x_s$, $z_s$ of the tool rest TBS that will exist when the nose of the tool TL1 is at the next machining starting point $P_{si}$. Thereafter, the processor uses the coordinate values of each of the positions occupied by the tool rest to create and store the following data in the RAM 106:

G00X$x_a$Z$z_a$;
G01X$x_b$Z$z_b$F$f_c$;
X$x_3'$ Z$z_3'$;
X$x_2'$ Z$z_2'$;
X$x_d$, Z$z_d$;
G00X$x_s$Z$z_s$;

This is followed by repeating processing from step (3a-10) onward.

(3a-14) If $x_a < (x_5+t)$ is found to hold in step (3a-4), the processor calculates the position $x_5'$, $z_5'$ of the tool rest TBS that will exist when the nose of the tool TL1 is situated at the point $P_5'$, which is spaced from the point $P_5$ by the finishing margin t along the +X axis and by the clearance c along the +Z axis. This position of the tool rest is calculated from the following equations:

$$x_5 + t + \Delta X_1 \rightarrow x_5'$$

$$z_5 + c + \Delta Z_1 \rightarrow z_5'$$

The processor also calculates the position $x_4'$, $z_4'$ of the tool rest TBS that will prevail when the nose of the tool TL1 is situated at the point $P_4'$, which is spaced from the point $P_4$ by the finishing margin t along both the +X and +Z axes. This position of the tool rest is calculated from the following equations:

$$x_4 + t + \Delta X_1 \rightarrow x_4'$$

$$z_4 + t + \Delta Z_1 \rightarrow z_4'$$

This is followed by obtaining the coordinate values $x_c$, $z_c$ of a point $P_{cn}$, which is spaced from the point $P_4'$ by $(d+u)$ along the $+X$ axis. These coordinate values are obtained from the following equations:

$$x_4+t+d+u \to x_c$$

$$z_4+t \to z_c$$

The processor then obtains the position $x_d'$, $z_d'$ of a point $P_{dn}$ at which the part contour is intersected by a straight line L2n parallel to the Z axis and passing through the point $P_{cn}$, followed by the coordinate values $x_d$, $z_d$ and $x_e$, $z_e$ of the tool rest TBS that will exist when the nose of the tool TL1 is respectively at points $P_{dn}'$ ($=P_{cn}'$), $P_e$ which are spaced from the point $P_{dn}$ by the finishing margin t and by the clearance c, along the $+Z$ axis. These coordinate values are obtained from the following equations:

$$x_d' + \Delta X_1 \to x_d$$

$$z_d' + t + \Delta Z_1 \to z_d$$

$$x_d \to x_e$$

$$z_d' + c + \Delta Z_1 \to z_e$$

The processor then obtains the position $x_f$, $z_f$ of the tool rest TBS that will exist when the nose of the tool TL1 is at the machining end point $P_f$, the position being found from the equations:

$$x_m + c + 66\, X_1 \to x_f$$

$$z_e \to z_f$$

When the coordinate values of the tool rest TBS at each of the points have been found through the foregoing steps, the processor 105 creates and stores the following in the RAM 106:

G00 X$x_5'$ Z$z_5'$;
G01 X$x_4'$ Z$z_4'$ F$f_c$;
X$x_d$ Z$z_d$;
X$x_e$ Z$z_e$;
G00 X$x_f$ Z$z_f$;
M99

Note that M99 denotes the end of the subprogram.

The foregoing ends processing for creating the subprogram of the first machining process (coarse machining).

Upon completing processing for creating the subprogram for the first machining operation, the processor 105 executes processing to create a subprogram SP2 for the second machining process for performing fine machining, which subprogram includes fine machining work and control of tool rest movement.

When coarse machining is completed, the tool rest TBS is retracted along the $+Z$ axis from the coarse machining end point $P_f$ to the point $P_r$ shown in FIG. 1(C), and is then transported along the $-X$ axis from point $P_r$ to point $P_t$ shown in FIG. 1(D). Moving the tool rest in this manner positions the fine machining tool TL2 at the fine machining starting point along the shortest traveling distance without the tools striking the workpiece WK.

(3b-1) Accordingly, the processor 105 generates, and stores in the RAM 106, the following subprogram number of the second machining process:

O 0002

(3b-2) The processor then obtains the maximum tool length ($\Delta Z_2$) from among $\Delta Z_1$, $\Delta Z_2$, $\Delta Z_3$ and subsequently calculates the coordinate values $x_r$, $z_r$ of the point $P_r$ from the following equations:

$$x_m + c \to x_r$$

$$z_6 + \Delta Z_2 + c \to z_r$$

It should be noted that $z_6$ is the Z-axis coordinate value of the point P6.

(3b-3) The processor 105 also calculates the coordinates values $x_t$, $z_t$ of the point $P_t$ from the following equations:

$$-(x_6 + \Delta X_2) \to x_t$$

$$z_r \to z_t$$

It should be noted that $x_6$ is the X-axis coordinate value of the point P6.

(3b-4) When the points $P_r$ and $P_t$ have been found, the processor creates and stores the following NC data in the RAM 106:

G00 X$x_r$ Z$z_r$;
X$x_t$ Z$z_t$;

Thus, the processor creates NC data for movement along the $+Z$ axis from point $P_f$ to point $P_r$, and NC data for movement along the $-X$ axis from point $P_r$ to point $P_t$.

Figure 4:
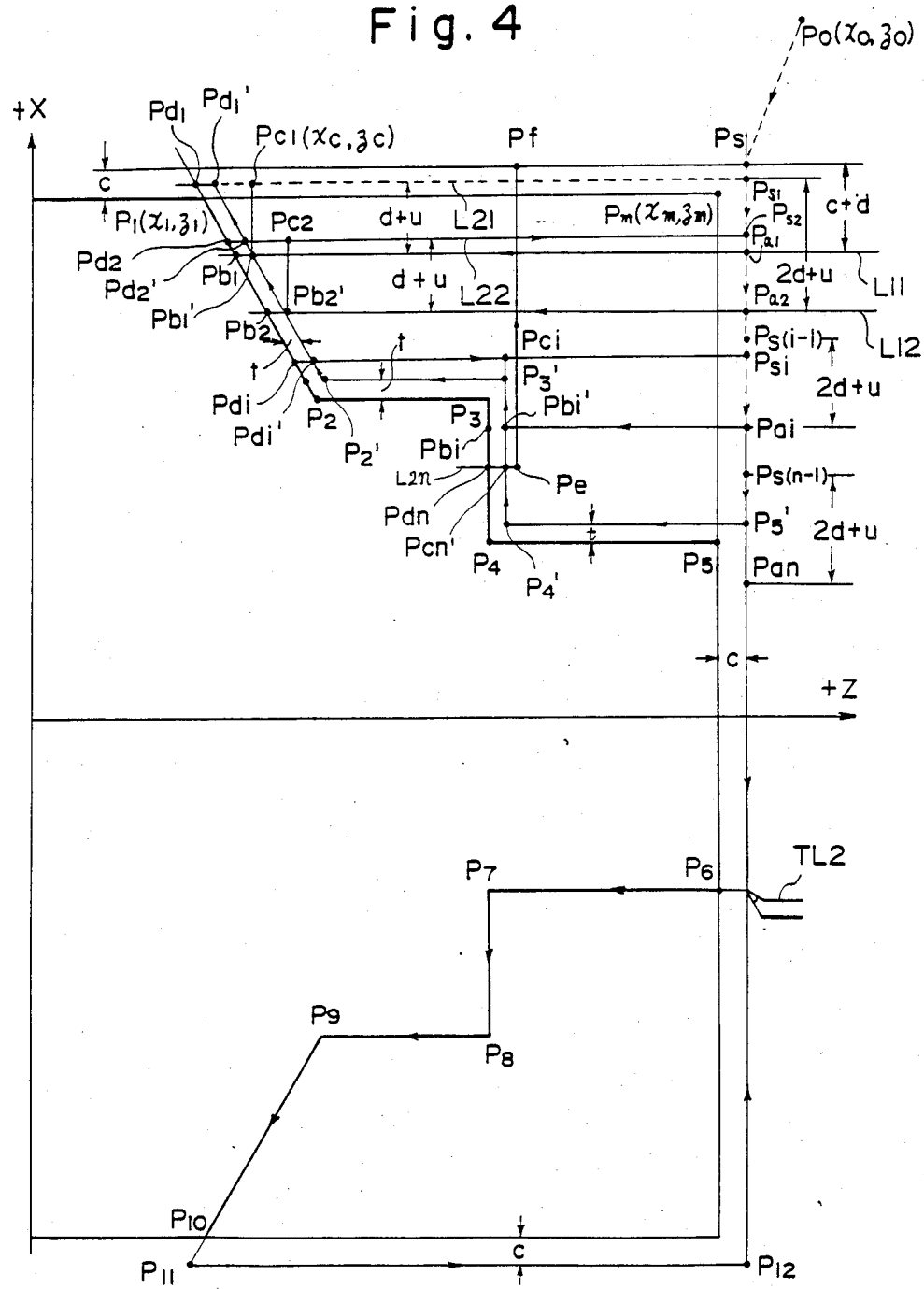
FIG. 4 illustrates a tool path according to the present invention.

(3b-5) Next, the processor 105 calculates the positional coordinate values $x_i'$, $z_i'$ (i=7, 8 ... 12) of the tool rest TBS that will exist when the nose of the tool TL2 (as shown in FIG. 4) is situated at points P7, P8, P9, P10, P11, P12, respectively. These coordinate values are calculated from the following equations:

$$x_i - \Delta X_2 \to x_i'$$

$$z_i - \Delta Z_2 \to z_i'$$

(where i=7, 8, 9, 10)

$$x_{10} - c - \Delta X_2 \to x_{11}'$$

$$z_{11} + \Delta Z_2 \to z_{11}'$$

$$x_{11}' \to x_{12}'$$

$$z_6 + c + \Delta Z_2 \to z_{12}'$$

where $z_{11}$ is the Z-axis coordinate value of the point of intersection between straight lines $\overline{P_9 P_{10}}$, $\overline{P_{11} P_{12}}$.

(3b-6) When the coordinates $x_i'$, $z_i'$ have been obtained, the processor creates, and stores in the RAM 106, the following path data for transporting the tool TL2 along the fine machining path:

G01 X$x_7'$ Z$z_7'$ F$f_c$;
X$x_8'$ Z$z_8'$;
X$x_9'$ Z$z_9'$;
X$x_{11}'$ Z$z_{11}'$;
G00 X$x_{12}'$ Z$z_{12}'$;
X$x_t$ Z$z_t$;

M99;

Thus, performing steps (3b-1) through (3b-6) ends processing for the creation of a subprogram for the second machining process (fine machining).

(3c) Thereafter, a subprogram SP3 for the third machining process, which program includes grooving machining work and control of tool rest movement for cutting a groove, is created through steps similar to those used to create the subprogram SP2. This completes the processing for the creation of all subprograms.

(3d) When all subprograms have been created, the processor 105 creates the following main program for calling the subprograms in machining process order:

O1234
M98 P0001;
M98 P0002;
M98 P0003;
M30;

and ends creation of the part program by arranging the part program in the RAM 106 in the order shown in FIG. 8, namely in the order of the main program MP, subprogram SP1, subprogram SP2 and subprogram SP3. The part program stored in the RAM 106 is subsequently delivered as an output to a tape puncher or magnetic unit 201. Note that "M98" denotes a subprogram call instruction for calling the subprogram having the program under which follows the letter of the alphabet "P", "M99" denotes end of the subprogram, and "M30" denotes end of the program.

(II) Machining Processing

Figure 9:
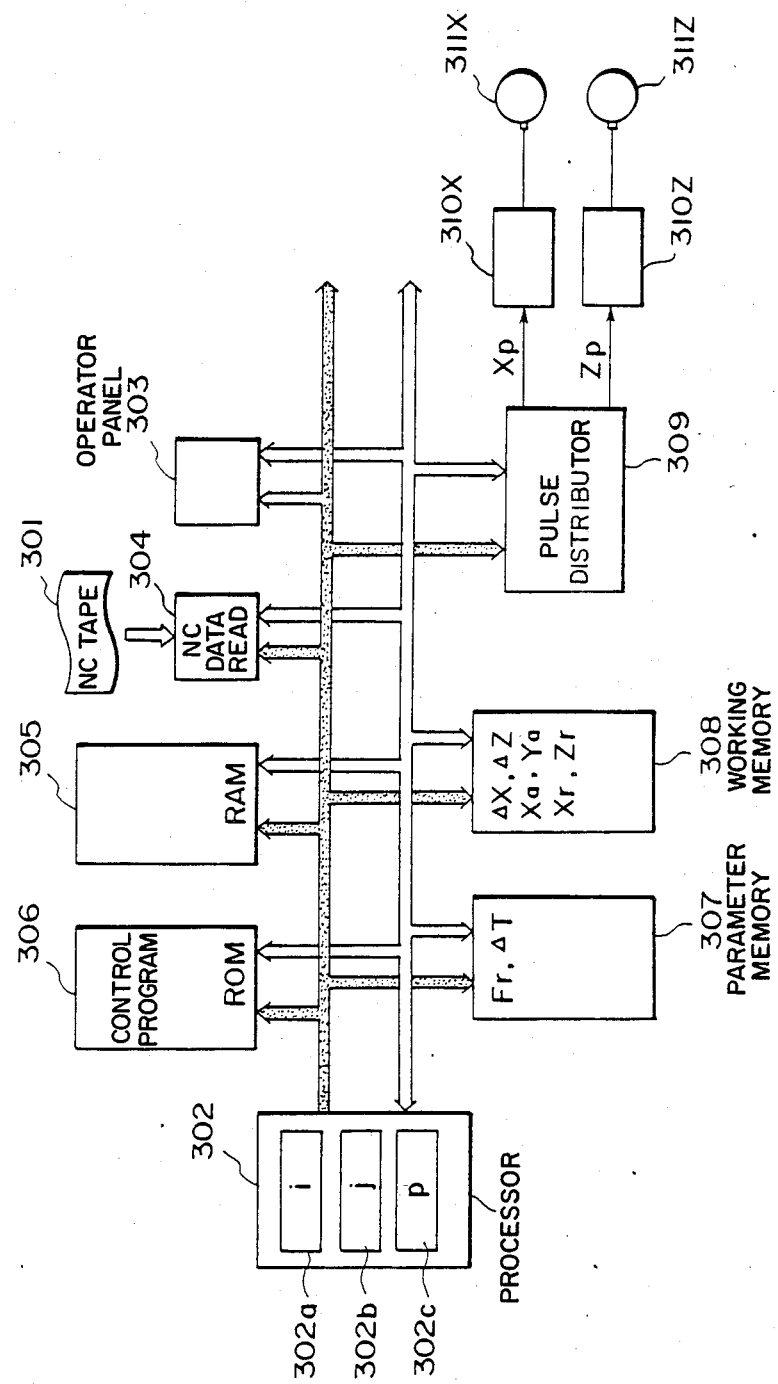
FIG. 9 is a block diagram of an NC apparatus.
Figure 10:
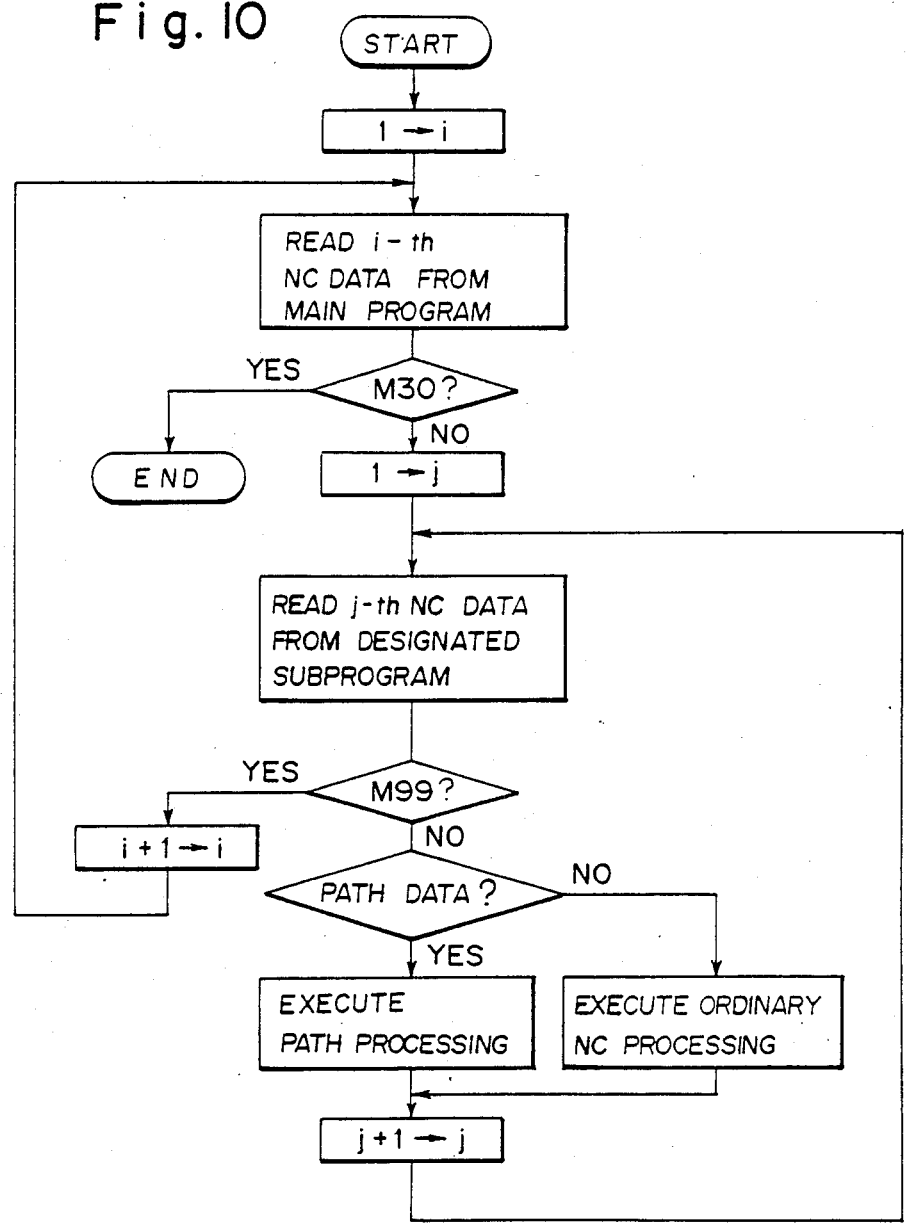
FIG. 10 is a flowchart for the processing to accomplish the machining performed by a comb-cutter lathe according to the present invention.

Machining processing performed by a comb-cutter lathe will now be described with reference to FIG. 9 which is a block diagram of an NC apparatus, and FIG. 10 which is a flowchart of machining processing.

An NC tape 301 records NC data created by the NC tape creating apparatus of FIG. 2. A processor 302 responds to a read request produced by an operator's panel 303 by actuating an NC data reading device 304 to store, in a RAM 305, all of the NC data recorded on the NC tape 301.

(1) When a start button on the operator's panel 303 is pressed under these conditions, the processor 302, under the control of a control program stored in a ROM 306, sets the sequence number i of the main program to 1, stores the sequence number in a general-purpose register 302a and reads the i-th block of NC data constituting the main program out of the RAM 305.

(2) The processor 302 determines whether the read NC data is an instruction "M30" indicative of the end of the program. If it is, the processor ends NC processing.

(3) If the NC data is not "M30", on the other hand, the processor 302 sets the sequence number j of a subprogram to 1 and stores the sequence number in a general-purpose register 302b. The processor 302 then goes to the RAM 305 and, from among the NC data read in step (1), reads out NC data belonging to the j-th block of the subprogram designated by the subprogram number which follows the letter of the alphabet "P" stored in a general-purpose register 302c.

(4) The processor 302 determines whether the NC data belonging to the j-th block of the subprogram is "M99".

(5) If the NC data is "M99", the following operation is performed:

$i+1 \rightarrow i$ after which the NC data belonging to the i-th block of the main program is read. Processing from step (2) onward is repeated.

(6) If the NC data belonging to the i-th block of the subprogram is NC data for path control rather than "M99", however, ordinary path control processing is carried out. For example, if the NC data is data such as:

G00 $Xx_r Zz_r$;

for moving the tool rest TBS from point $P_f$ (FIG. 4) to point $P_r$, then the processor 303 calculates incremental values $X_j$, $Z_j$ along the respective axes from point $P_f$ to point $P_r$ (actually, $X_j=0$).

Thereafter, velocity components $F_x$, $F_z$ along the respective axes are calculated in accordance with the following equations from rapid-traverse velocity $F_r$ and $X_j$, $Y_j$, which are stored in a parameter memory 307:

$$F_x = F_r \cdot X_j / \sqrt{X_j^2 + Z_j^2}$$

$$F_z = F_r \cdot Z_j / \sqrt{X_j^2 + Z_j^2}$$

Next, in accordance with the following equations, there are obtained traveling distances $\Delta X$, $\Delta Z$ for movement along the respective axes during a period of time $\Delta T$ sec (=8 msec) which is stored in the parameter memory 307:

$\Delta X = F_x \cdot \Delta T$ $\Delta Z = F_z \cdot \Delta T$

Values are stored in a working memory 308. When $\Delta X$, $\Delta Z$ have been obtained, the processor 303 applies them as inputs to a pulse distributor 309 every $\Delta T$ sec. Based on the input data $\Delta X$, $\Delta Z$, the pulse distributor 309 performs simultaneous two-axis pulse distribution computations to generate distributed pulses $X_p$, $Z_p$, which are applied as inputs to X- and Z-axis servomotors 310X, 310Z. As a result, X- and Z-axis motors 311X, 311Z, respectively, for driving the tool rest, are rotated to transport the tool rest toward the point $P_r$.

The processor 303, in accordance with the following formulae, updates the present position $X_a$, $Z_a$ along the respective axes every $\Delta T$ sec, the updated values of $X_a$ and $Z_a$ being stored in the working memory 303:

$X_a \pm \Delta X \rightarrow X_a$ $Z_a \pm \Delta Z \rightarrow Z_a$

The sign depends upon the direction of movement. Similarly, in accordance with the following formulae, the processor updates remaining traveling distances remaining to be travelled $X_r$, $Z_r$ (the initial values of which are $X_i$, $Z_i$, respectively) every $\Delta T$ sec, the updated values of $X_r$ and $Z_r$ being stored in the working memory 308:

$X_r - \Delta X \rightarrow X_r$ $Z_r - \Delta Z \rightarrow Z_r$

When the tool rest TBS arrives as the point $P_r$ and the following condition is established, $X_r = Z_r = 0$ (i.e., the distance remaining to be travelled is zero) the processor 303 ends path control processing.

(7) The processor 303 increments the sequence number j of the subprogram by performing the following operation:

$$j+1 \to j$$

reads the NC data belonging to the j-th block of the subprogram designated by the subprogram number stored in the general-purpose register 302c, and repeats processing from step (4) onward. If the NC data read next is path control NC data for moving the tool rest from point $P_r$ to point $P_t$ and path control processing similar to the foregoing is to be performed thereafter, the tool rest is positioned at point $P_t$.

Thus, according to the present invention, the arrangement is such that when changing tools in a comb-cutter lathe, the tool rest is temporarily retracted along the Z axis so that a tool will not interfere with the workpiece when moved along the X axis, and the tool rest is then moved along the X axis to position a selected toll at the X coordinate of a point at which machining is be started by the tool. In changing tools, therefore, a tool will not interfere with the workpiece even when the tool rest is moved along the axis.

Further, according to the present invention, an NC part program for a comb-cutter lathe can be created merely by entering part dimensions, a tool selection sequence, machining location and tool mounting position, etc., and the path followed by a tool rest can be generated automatically without specifying the path of the tool rest when selecting a tool.

In addition, the present invention makes it possible to minimize the traveling distance of a tool rest during tool selection so that the total time required to change tools can be reduced.

While the foregoing description relates to a case where the two tools TL1 and TL2 are provided in juxtaposition on the tool rest, the invention is not limited to two tools but can be applied to three or more tools mounted on a tool rest. Further, though the description given above regards a transition from machining in the first quadrant to machining in the fourth quadrant, the invention is not limited to such but can be applied to various configurations in which machining is exercised from the fourth to the first quadrant or within one and the same quadrant, etc.

In numerically controlling a comb-cutter lathe, the present invention prevents a tool from interfering with a workpiece, enables the path of a tool rest at the time of a tool change to be generated automatically, and minimizes the length of the tool path. The invention is therefore well-suited for application to control of a comb-cutter lathe.

We claim:

1. A method of controlling a comb-cutter lathe having a tool rest movable in an X-Z orthogonal coordinate system, the tool rest having two or more juxtaposed tools mounted thereon for subjecting a workpiece, having a turning axis coinciding with the Z-axis, to machining by using predetermined ones of the tools in succession, such that after machining is completed in a first quadrant by one tool the tool rest is moved in order to position another one of the tools at a machining location in a second quadrant and machining is preformed by the other tool, said method comprising the steps of:

(a) automatically moving the tool rest along the Z-axis to a point $P_r$ at which none of the tools will contact the workpiece when the tool rest is moved along the Z-axis from the first quadrant to the second quadrant, a Z-axis coordinate value of the point $P_r$ being determined in accordance with a maximum length of said juxtaposed tools;

(b) selecting one of the tools for machining the workpiece in the second quadrant;

(c) automatically moving the tool rest along the X-axis from the point $P_r$ to a point $P_t$, in the second quadrant at which an X-axis position of the selected tool coincides with an X-axis coordinate value of a machining starting point at which machining is to be started by the selected tool; and (d) performing machining in the second quadrant using the selected tool.

2. A method of controlling a comb-cutter lathe according to claim 1, wherein a Z-axis coordinate value $z'$ of said point $P_r$ is calculated from the following:

$$z' = z + \Delta Z + c$$

where z is a Z-axis coordinate value of said machining starting point position, c is a clearance quantity, and $\Delta Z$ is a distance measured along the Z axis from a reference point on the tool rest to a distal end of a tool having the longest length among the tools mounted on the tool rest.

3. A method of controlling a comb-cutter lathe according to claim 2, wherein an X-axis coordinate value $x'$ of said point $P_r$ is calculated from the following:

$$x' = x + \Delta X + c$$

where x is an X-axis coordinate value of said machining starting point position, c is a clearance quantity and $\Delta X$ is a distance measured along the X axis from the reference point on the tool rest to a distal end of the selected tool.

4. A method of controlling a comb-cutter lathe according to claim 1, wherein said lathe is controlled an NC controller and wherein step (d) comprises the sub-steps of:

(1) entering part dimensions of a part to be machined into the NC controller;
   (2) entering a tool selection sequence;
   (3) entering a machining start location for each of the tools;
   (4) entering mounting dimensions information of the tools measured from a reference point on the tool rest to a distal point on each tool; and
   (5) sequentially performing machining based on the entered information using predetermined tools in accordance with said tool selection sequence and starting machining with each tool at a corresponding one of each machining start locations assigned to said tools.

5. A method of controlling a comb-cutter lathe having a tool rest movable in an X-Z orthogonal coordinate system, the tool rest having two or more tools mounted thereon for subjecting a workpiece, having a turning axis coinciding with the Z-axis, to machining, said method comprising the steps of:

(1) selecting a machining start point spaced from the workpiece by a clearance quantity c;
   (2) selecting a tool for machining the workpiece;
   (3) determining the desired shape of the workpiece;
   (4) determining the mounting position of each of said tools with respect to a reference point on the tool rest;

(5) determining a machining end point for said selected tool in accordance with said clearance quantity c and said mounting position of the selected tool;
(6) machining the workpiece in accordance with the desired shape, the clearance quantity c and said mounting position of the selected tool until said machining end point is reached;
(7) determining a longest tool having a distal point spaced along the Z axis first from said reference point on the tool rest;
(8) determining a point $P_r$ in accordance with said desired shape of the workpiece, said clearance quantity c, and the mounting position of the longest tool, such that the distal point of said longest tool is spaced from the workpiece by not less than the quantity c when the tool rest is moved along the Z-axis;
(9) moving the tool rest to the point $P_r$;
(10) selecting another tool for machining the workpiece;
(11) determining a point $P_t$ in accordance with the mounting position of said another tool, the point $P_r$ and said desired shape of the workpiece;
(12) moving the tool rest to the point $P_t$,
(13) determining a tolerance quantity t of said desired shape of said workpiece; and
(14) machining the workpiece with said another tool in accordance with said tolerance quantity t and said desired shape of the workpiece.

* * * * *

UNITED STATES PATENT AND TRADEMARK OFFICE
CERTIFICATE OF CORRECTION

PATENT NO. : 4,680,719
DATED : July 14, 1987
INVENTOR(S) : Hajimu Kishi; Masaki Seki; Takashi Takegahara It is certified that error appears in the above-identified patent and that said Letters Patent is hereby corrected as shown below:

[57] ABSTRACT, line 25, "thenforth" should be -- Henceforth --.

Column 2, line 33, after "shows" insert -- a created part program --; delete "a created part program --.

Column 5, line 3, "$>$" should be -- $\geq$ --.

Column 6, line 53, after "the" 2nd (occurrence) insert coarse machining --,

Column 6, line 61, "prevail" should be -- exist --.

Column 7, line 17, "," should be -- and --; after "spaced" insert -- respectively --.

Column 7, line 35, "66" should be -- $\Delta$ --.

Column 10, line 34, "Values" should be -- These values --.

Signed and Sealed this

Seventh Day of June, 1988

*Attest:*

DONALD J. QUIGG

*Attesting Officer*   *Commissioner of Patents and Trademarks*